United States Patent
Sinha et al.

(10) Patent No.: US 11,473,799 B2
(45) Date of Patent: *Oct. 18, 2022

(54) SYSTEMS AND METHODS FOR INTELLIGENT PIC VALVES WITH AGENT INTERACTION

(71) Applicant: Johnson Controls Tyco IP Holdings LLP, Milwaukee, WI (US)

(72) Inventors: Sudhi R. Sinha, Milwaukee, WI (US); Donald R. Albinger, New Berlin, WI (US); Youngchoon Park, Brookfield, WI (US); Karl F. Reichenberger, Mequon, WI (US); John T. Pierson, Whitefish Bay, WI (US); Vineet Sinha, Milwaukee, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 50 days.

This patent is subject to a terminal disclaimer.

(21) Appl. No.: 16/989,460

(22) Filed: Aug. 10, 2020

(65) Prior Publication Data

US 2021/0025612 A1   Jan. 28, 2021

Related U.S. Application Data

(63) Continuation of application No. 15/968,278, filed on May 1, 2018, now Pat. No. 10,739,029.
(Continued)

(51) Int. Cl.
*F24F 11/83* (2018.01)
*F24F 11/38* (2018.01)
(Continued)

(52) U.S. Cl.
CPC .......... *F24F 11/38* (2018.01); *F16K 37/0075* (2013.01); *F24F 11/32* (2018.01);
(Continued)

(58) Field of Classification Search
CPC ....................................................... F24F 11/83
(Continued)

(56) References Cited

U.S. PATENT DOCUMENTS 9,817,383 B1   11/2017  Sinha et al.
2004/0020532 A1   2/2004  Tanaka et al.
(Continued)

FOREIGN PATENT DOCUMENTS

GB    1 480 173 A    7/1977
GB    2 487 611 A    8/2012

OTHER PUBLICATIONS

International Search Report and Written Opinion on PCT/US2018/030484, dated Aug. 2, 2018, 16 pages.

*Primary Examiner* — Suresh Suryawanshi
(74) *Attorney, Agent, or Firm* — Foley & Lardner LLP

(57) ABSTRACT

A flow control device is configured to control fluid flow in an HVAC system. The flow control device includes a valve, an actuator configured to open and close the valve, and one or more sensors. The flow control device further includes a fault detection and correction agent configured to receive data from the one or more sensors, analyze the data according to a set of rules, and detect whether one or more faults have occurred. In response to detecting a fault, the fault detection and correction agent is configured to either operate the actuator to open or close the valve or initiate a corrective action to be taken by another device in the HVAC system.

20 Claims, 13 Drawing Sheets

Related U.S. Application Data

(60) Provisional application No. 62/492,825, filed on May 1, 2017.

(51) Int. Cl.

| | | |
|---|---|---|
| *G05B 13/04* | (2006.01) | |
| *G05B 13/02* | (2006.01) | |
| *G05D 7/06* | (2006.01) | |
| *F24F 11/65* | (2018.01) | |
| *F16K 37/00* | (2006.01) | |
| *F24F 11/54* | (2018.01) | |
| *F24F 11/84* | (2018.01) | |
| *G06Q 50/16* | (2012.01) | |
| *F24F 11/64* | (2018.01) | |
| *F24F 11/74* | (2018.01) | |
| *F24F 11/32* | (2018.01) | |
| *F24F 11/80* | (2018.01) | |
| *F24F 11/873* | (2018.01) | |
| *G05B 15/02* | (2006.01) | |
| *F24F 140/20* | (2018.01) | |
| *F24F 140/12* | (2018.01) | |
| *F24F 140/40* | (2018.01) | |
| *F24F 11/86* | (2018.01) | |

(52) U.S. Cl.
CPC .............. *F24F 11/54* (2018.01); *F24F 11/64* (2018.01); *F24F 11/65* (2018.01); *F24F 11/74* (2018.01); *F24F 11/80* (2018.01); *F24F 11/83* (2018.01); *F24F 11/84* (2018.01); *F24F 11/873* (2018.01); *G05B 13/0265* (2013.01); *G05B 13/041* (2013.01); *G05B 15/02* (2013.01); *G05D 7/0652* (2013.01); *G05D 7/0664* (2013.01); *G06Q 50/16* (2013.01); *F24F 11/86* (2018.01); *F24F 2140/12* (2018.01); *F24F 2140/20* (2018.01); *F24F 2140/40* (2018.01); *G05B 2219/2642* (2013.01)

(58) Field of Classification Search
USPC ........................................................ 700/276
See application file for complete search history.

(56) References Cited

U.S. PATENT DOCUMENTS

| | | | |
|---|---|---|---|
| 2009/0083583 A1* | 3/2009 | Seem | ........................ G05B 5/01 714/39 |
| 2011/0047418 A1 | 2/2011 | Drees et al. | |
| 2013/0105326 A1 | 5/2013 | Averbeck et al. | |
| 2014/0094736 A1 | 4/2014 | Dos Santos | |
| 2014/0283918 A1 | 9/2014 | Dederich | |
| 2015/0088321 A1* | 3/2015 | Schmidt | ................. G05B 13/02 700/282 |
| 2015/0176931 A1 | 6/2015 | Aeberhard et al. | |
| 2015/0233597 A1 | 8/2015 | Dempster et al. | |
| 2015/0323200 A1 | 11/2015 | Gluck et al. | |
| 2016/0061003 A1 | 3/2016 | Gottumukkala et al. | |
| 2016/0284041 A1 | 9/2016 | Schluessler et al. | |
| 2016/0308473 A1 | 10/2016 | Alexander et al. | |
| 2017/0322534 A1 | 11/2017 | Sinha et al. | |
| 2018/0024520 A1 | 1/2018 | Sinha et al. | |
| 2018/0031256 A1* | 2/2018 | Gillette | .................... F24F 11/38 |
| 2018/0275625 A1 | 9/2018 | Park et al. | |

* cited by examiner

SYSTEMS AND METHODS FOR INTELLIGENT PIC VALVES WITH AGENT INTERACTION

CROSS-REFERENCE TO RELATED PATENT APPLICATION

This application is a continuation of U.S. patent application Ser. No. 15/968,278 filed May 1, 2018, which claims the benefit of and priority to U.S. Provisional Patent Application No. 62/492,825 filed May 1, 2017, the entire disclosures each of which are incorporated by reference herein.

BACKGROUND

The present disclosure relates generally to building management systems. The present disclosure relates more particularly to systems and methods for extending a wireless mesh network of multiple wireless BMS devices to allow for wireless communication from various BMS monitoring devices to one or more BMS controllers.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include a variety of devices (e.g., HVAC devices, controllers, chillers, fans, sensors, etc.) configured to facilitate monitoring and controlling the building space. Throughout this disclosure, such devices are referred to as BMS devices or building equipment.

HVAC network control applications have moved beyond the arena of comfort to optimization. The value that optimization brings to customers provides additional efficiency in the customer's mechanical systems, which is expected to yield energy savings. One of the barriers to HVAC upgrades by a customer may be the upfront capital requirements having long lead time for the return on investment. This can lead to deferral of upgrades until mechanical equipment failure occurs. However, new software development techniques can enable optimization with lower upfront costs, by eliminating hardware complexity and relying upon a network of simple devices to accomplish the same level of optimization as more complex hardware devices.

SUMMARY

One implementation of the present disclosure is a flow control device configured to control fluid flow in an HVAC system. The flow control device includes a valve, an actuator configured to open and close the valve, and one or more sensors. The flow control device further includes a fault detection and correction agent configured to receive data from the one or more sensors, analyze the data from the one or more sensors according to a set of rules, and detect whether one or more faults have occurred. In response to detecting a fault, the fault detection and correction agent is configured to determine whether the fault can be corrected by opening or closing the valve. In response to determining the fault can be corrected by opening or closing the valve, the fault detection and correction agent is configured to correct the fault by operating the actuator to open or close the valve. In response to determining the fault cannot be corrected by opening or closing the valve, the fault detection and correction agent is configured to initiate a corrective action to be taken by another device in the HVAC system.

Another implementation of the present disclosure is a flow control system configured to control fluid flow in an HVAC system. The flow control system includes a first flow control device comprising a first valve, one or more sensors, and a first actuator configured to open and close the first valve. The flow control system further includes a second flow control device comprising a second valve, one or more sensors, and a second actuator configured to open and close the second valve. The flow control system further includes an optimization agent configured to receive data from the one or more sensors of the first flow control device and the second flow control device. The optimization agent is further configured to determine an optimal position of the first valve and the second valve using the data from the first flow control device and the second flow control device.

Another implementation of the present disclosure is a flow control system configured to control fluid flow in an HVAC system. The flow control system includes a plurality of flow control devices each comprising a valve, one or more sensors, and an actuator configured to open and close the valve. The flow control system further includes a learning agent configured to receive and use data from the one or more sensors to generate a model for each flow control flow control device according to the generated model.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, systems and methods related to an agent based flow control system are shown, according to various embodiments. An HVAC system can include equipment such as chillers, boilers, pumps, and valves used to circulated heated and chilled fluid through piping. An intelligent flow control device includes a valve, one or more sensors, and an actuator configured to open and close the valve. The actuator is dynamically controlled by one or more software agents. A fault detection and correction agent can be configured to diagnose and correct faults in the flow control system. An optimization agent can be configured to determine optimal valve positions throughout the system. A learning agent can be configured to generate and train a model of the system that can be used to operate intelligent flow control devices and other equipment in the system. Agent based control applied to pressure independent control valves provides dynamic control functionality and improved system performance.

Building Management System and HVAC System

Figure 1:
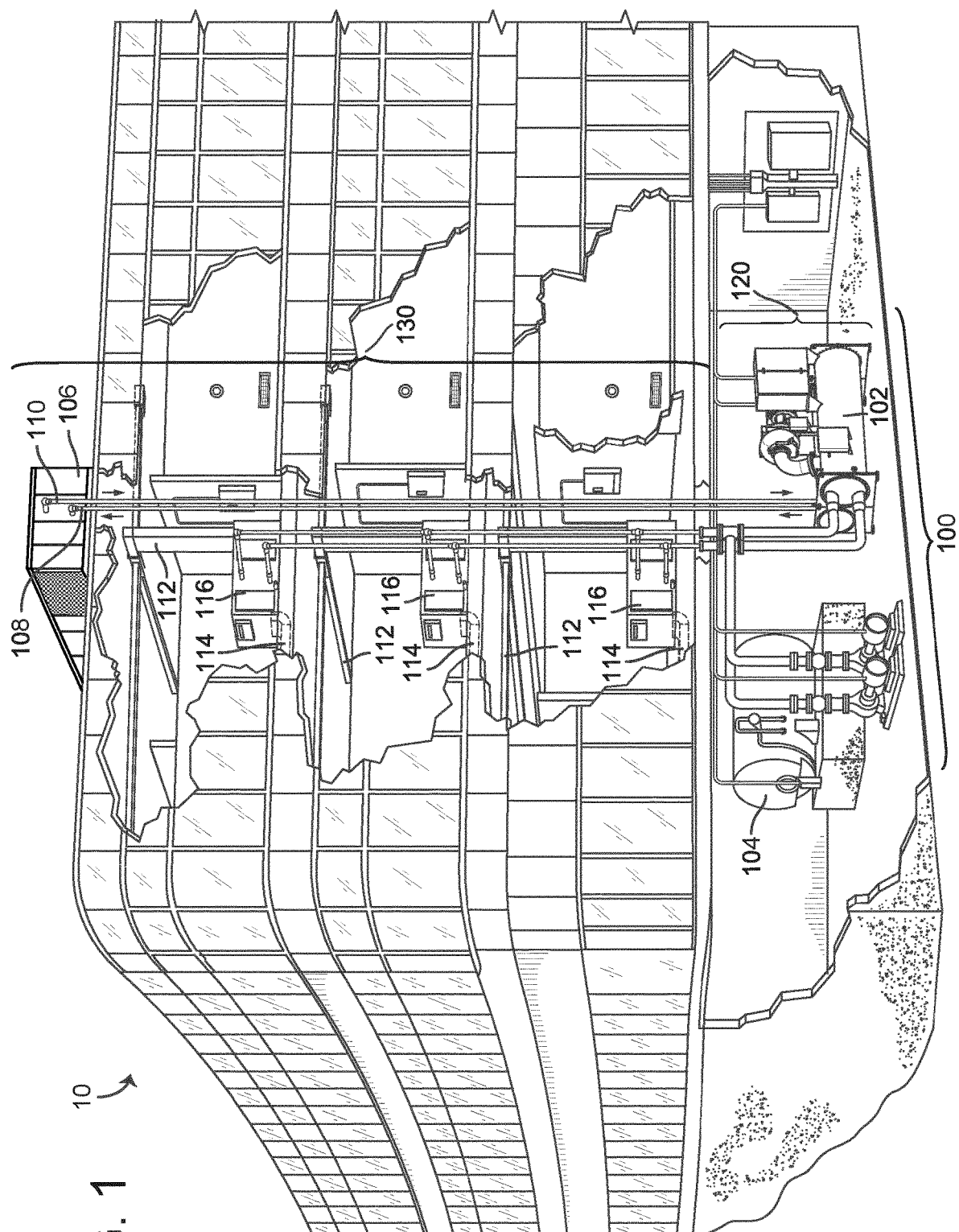
FIG. 1 is a drawing of a building equipped with a HVAC system, according to an exemplary embodiment.

Referring now to FIGS. 1-4, an exemplary building management system (BMS) and HVAC system in which the systems and methods of the present invention may be implemented are shown, according to one embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, an HVAC system, a security system, a lighting system, a fire alerting system, or any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
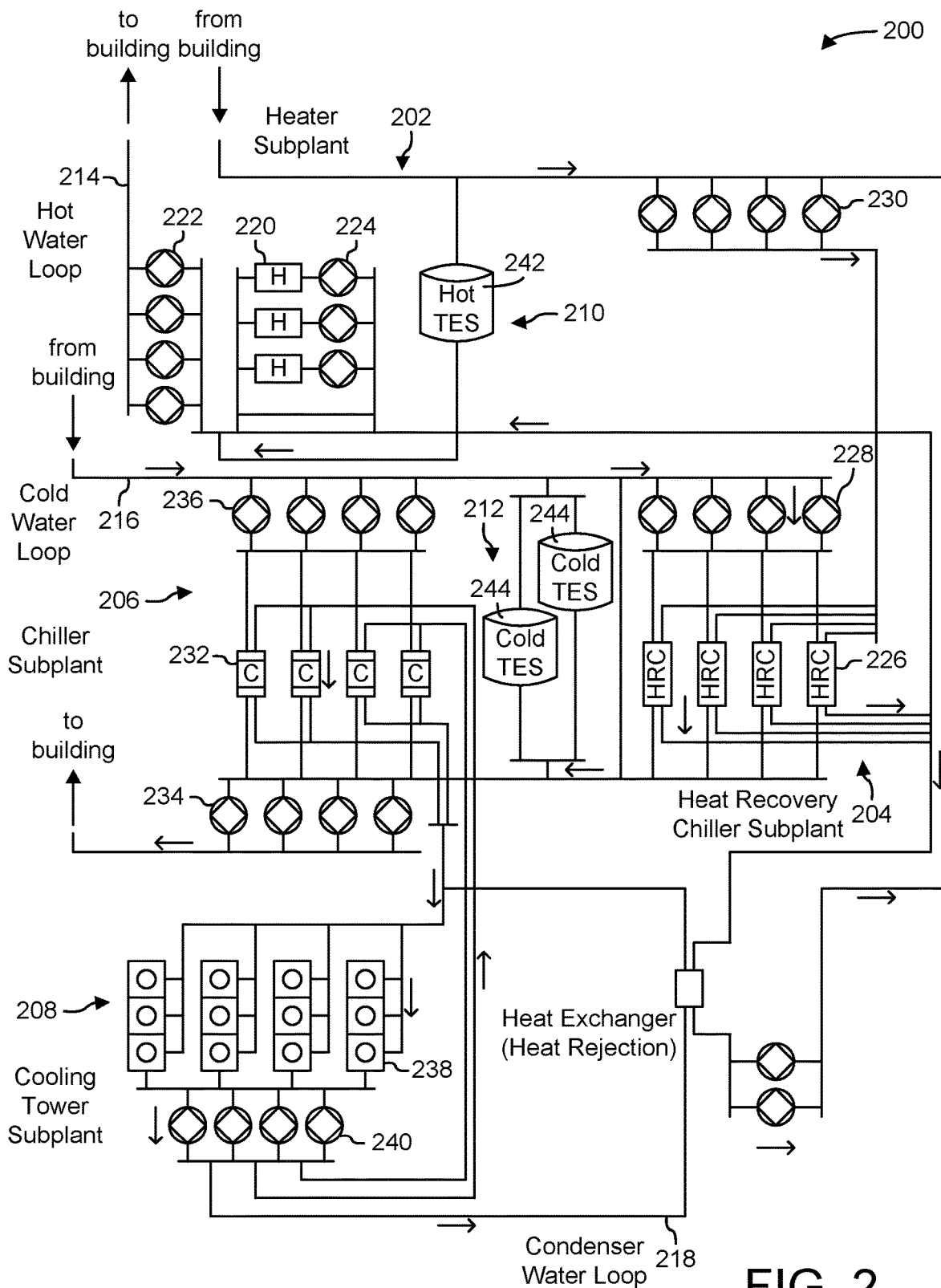
FIG. 2 is a block diagram of a waterside system that may be used in conjunction with the building of FIG. 1, according to an exemplary embodiment.

Referring now to FIG. 2, a block diagram of a waterside system 200 is shown, according to one embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between the chiller subplant 206 and the building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
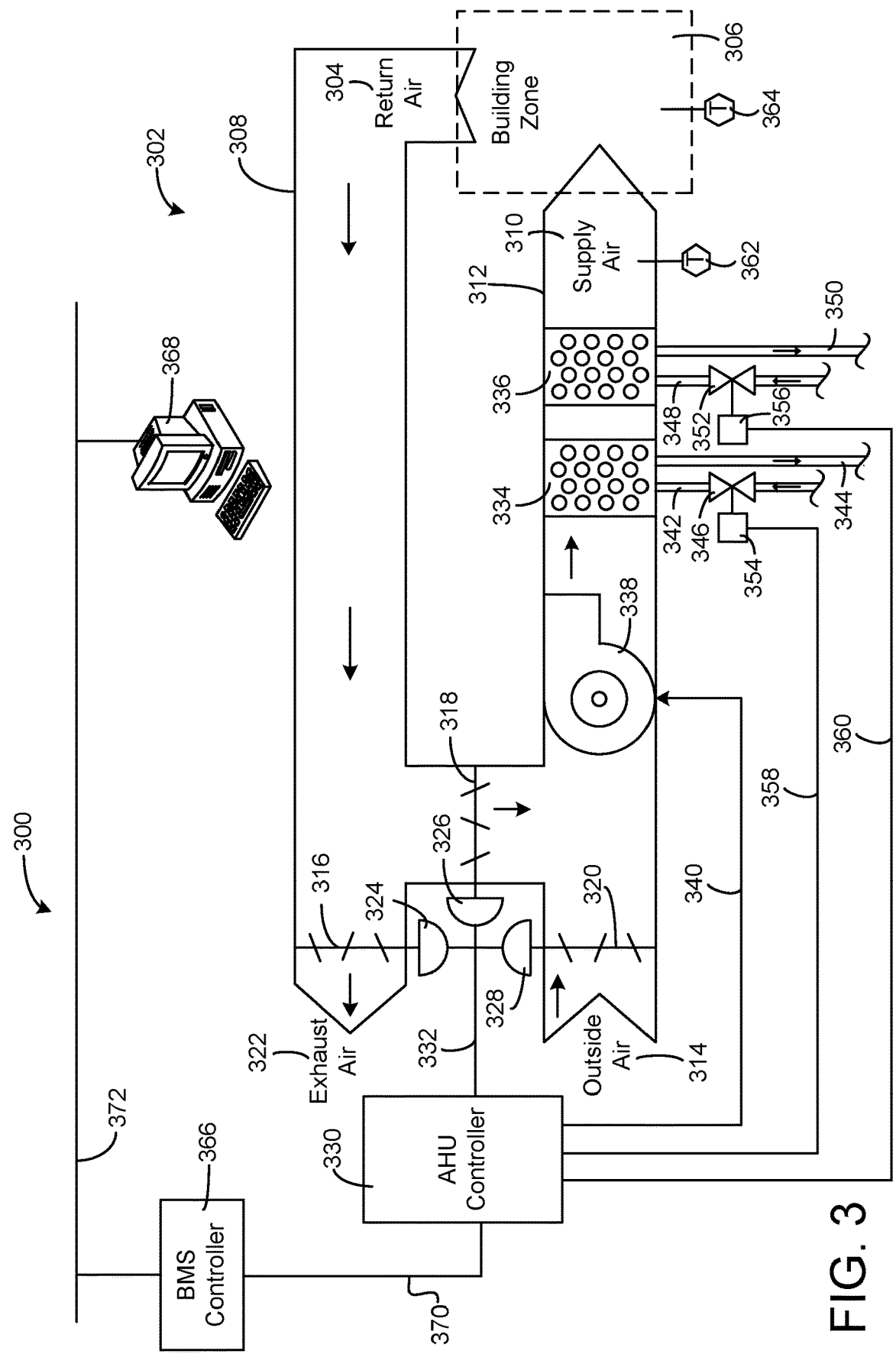
FIG. 3 is a block diagram of an airside system that may be used in conjunction with the building of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
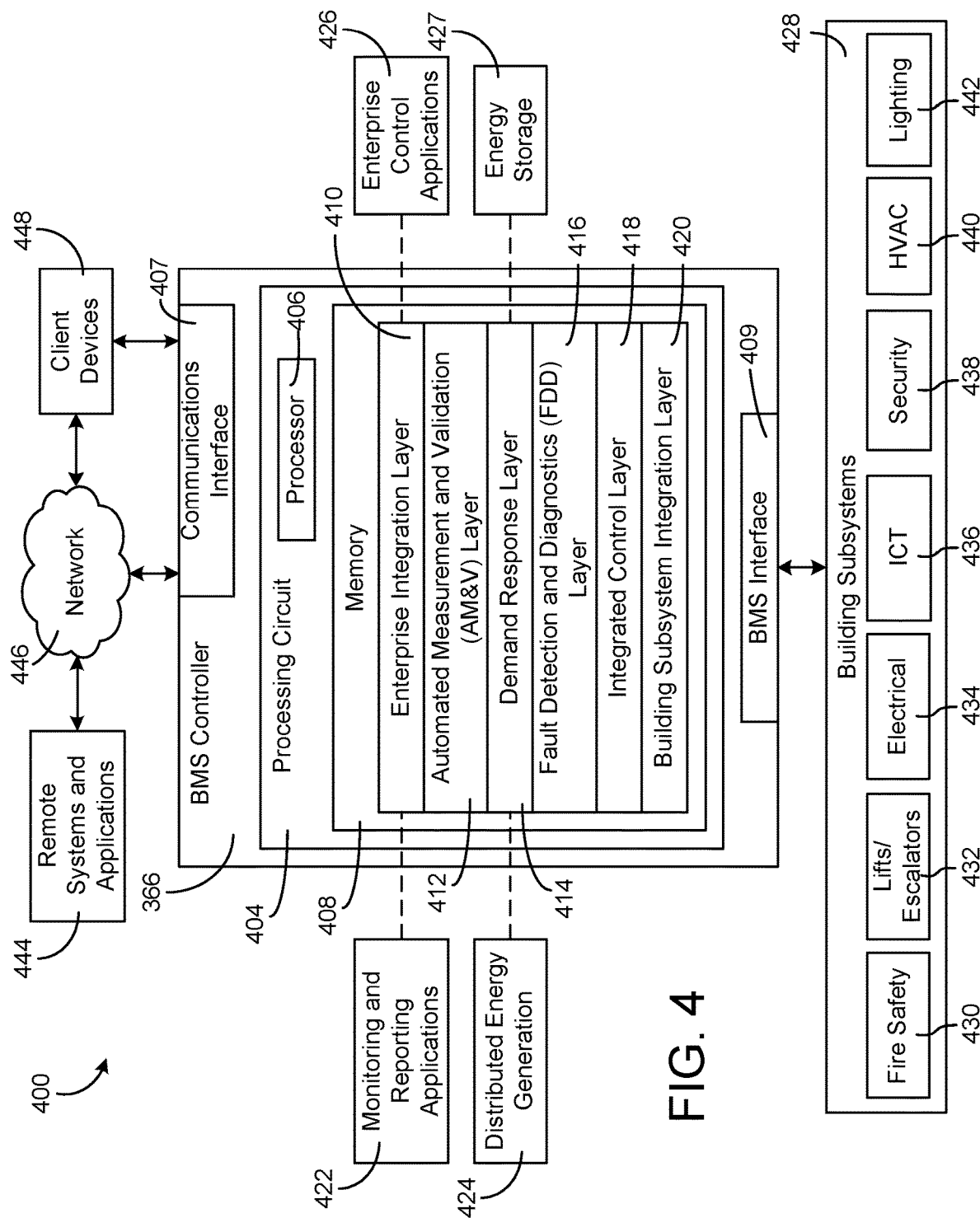
FIG. 4 is a block diagram of a building management system (BMS) that may be used to monitor and/or control the building of FIG. 1, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Adaptive Agent Based Control System

Figure 5:
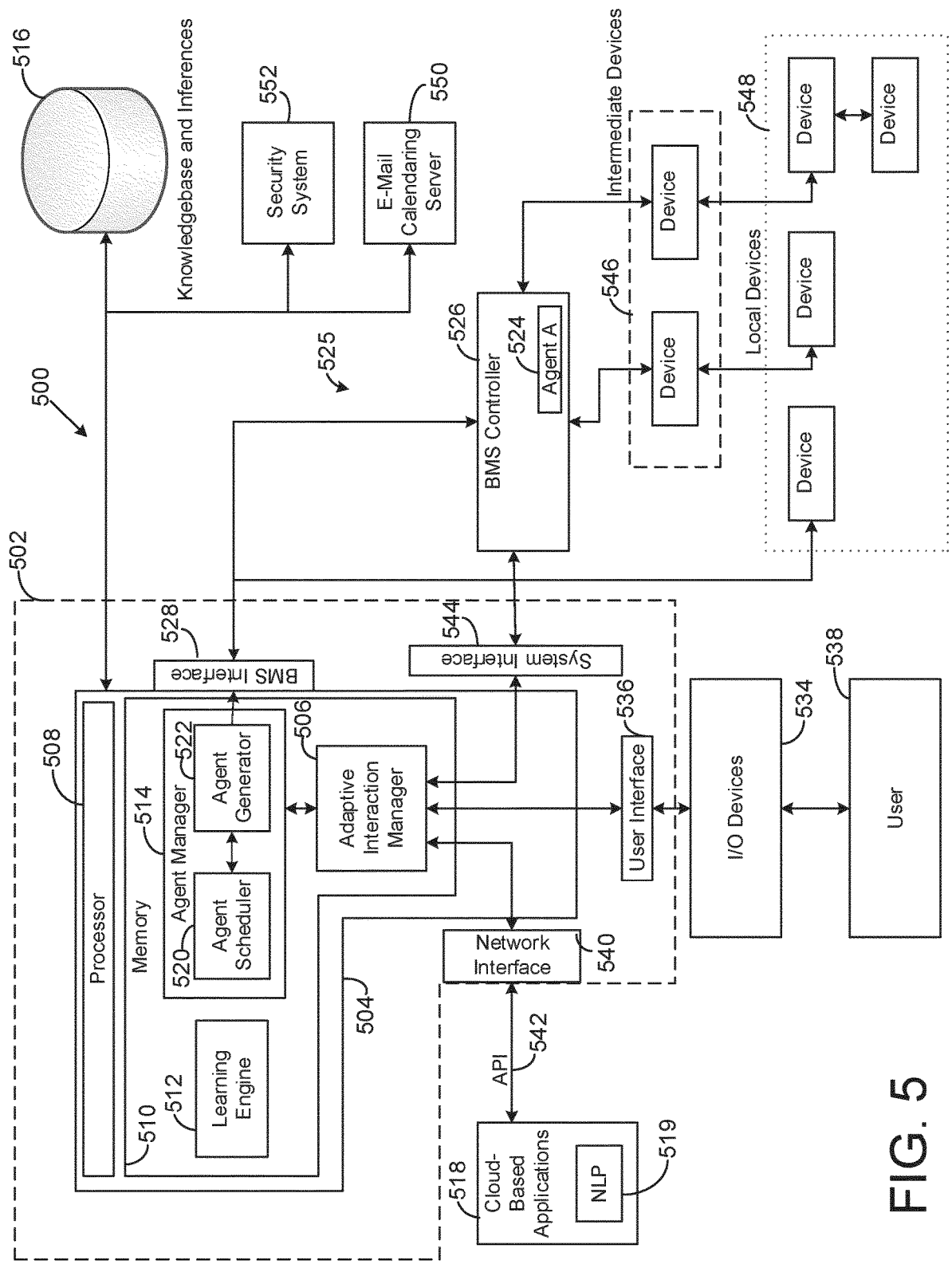
FIG. 5 is a block diagram illustrating an adaptive agent based control system, according to some embodiments.

Referring now to FIG. 5, a block diagram illustrating an adaptive agent based control system 500 is shown, according to one embodiment. The system 500 may be any of the BMS systems described above. Further, the system 500 may be a peer-to-peer (P2P) network, such as a Verisys system from Johnson Controls. The system 500 may include a controller 502. The controller 502 may be a dedicated controller within a BMS. In one embodiment, the controller 502 is a cloud based server (i.e. an internet based server). For example, the controller 502 may be physically located in one or more server farms and accessible via an internet connection. In some examples, the controller may be a standalone device in a peer-to-peer (P2P) network, such as a Verisys system from Johnson Controls. The controller 502 may include a processing circuit 504 including an adaptive interaction manager 506. The processing circuit 504 may include a processor 508 and a memory 510. The processor 508 may be a general purpose or specific purpose processor, an application specific integrated circuit (ASIC), one or more field programmable gate arrays (FPGAs), a group of processing components, or other suitable processing components. The processor 508 is configured to execute computer code or instructions stored in the memory 510 or received from other computer readable media (e.g., CDROM, network storage, a remote server, etc.).

The memory 510 may include one or more devices (e.g., memory units, memory devices, storage devices, etc.) for storing data and/or computer code for completing and/or facilitating the various processes described in the present disclosure. The memory 510 may include random access memory (RAM), read-only memory (ROM), hard drive storage, temporary storage, non-volatile memory, flash memory, optical memory, or any other suitable memory for storing software objects and/or computer instructions. The memory 510 may include database components, object code components, script components, or any other type of information structure for supporting the various activities and information structures described in the present disclosure. The memory 510 may be communicably connected to the processor 508 via the processing circuit 504 and may include computer code for executing (e.g., by the processor 508) one or more processes described herein. When the processor 508 executes instructions stored in the memory 510, the processor 508 generally configures the processing circuit 504 to complete such activities.

The memory 510 may include the adaptive interaction manager 506, a learning engine 512 and an agent manager 514. The learning engine 512 may be used to generate and access historical information, user feedback information, etc. In one embodiment, the learning engine 512 may access a database 516 via the processing circuit 504. The database 516 may include data relating to one or more BMS's, such as building layouts, system schematics, device information, control schemes, environmental ratings, historical data, etc. In one embodiment, the database 516 includes contextual information. The contextual information may include dictionaries, historical data, scripts, and/or other data for interpreting contextual information. The database 516 may further include a knowledgebase, which may include previous commands, user responses, generated outputs, device information, agent specific learning, etc. The database 516 may further include one or more inferences. The inferences may include contextual inferences, historical inferences, etc. In some embodiments, the learning engine 512 may provide the inferences to the database 516. The learning engine 512 may further update the inferences, as well as other data, of the database 516 over time. The learning engine 512 may further access data within the database 516 to aid in the generation of agents, as will be discussed below. The database 516 may further include one or more universal truths associated with the system 500. In one embodiment, the universal truths may be associated with one or more BMS controllers or devices within the system 500. In one embodiment, the universal truths may be arranged in a universal truth table, which may be populated with universal truths for a given system, such as system 500. Example universal truths may include a defined communication schemes between BMS devices and/or controllers.

The agent manager 514 is further shown to include an agent scheduler 520 and an agent generator 522. In some embodiments, the agent scheduler 520 maintains a record of all agents previously generated and active within the system 500. Further the agent scheduler 520 may also maintain real time data relating to which agents are currently active, and which agents are not currently active. The agent scheduler may further maintain real time data relating to which device within the system 500 a particular agent is currently associated with. For example, as shown in FIG. 5, agent 'A' 524 is associated with a BMS controller 526 within a BMS 525 of the system 500. The BMS 525 can be any combination of BMS devices as described above in regards to FIGS. 1-4. Further, the BMS 525 can be understood to be a residential system, such as a home controller. The BMS controller 526 may be any BMS controller, as described above in regards to FIGS. 1-4. Alternatively, the BMS controller 526 may be a dedicated BMS interface device, such as an Athens Smart Hub device from Johnson Controls. The agent scheduler 520 may therefore maintain a record of the agent 'A' 524 being associated with the BMS controller 526, as well as the current status of the agent 'A' 524.

The agent generator 522 may generate a number of agents, such as agent 'A' 524, for use in the system 500. The agents, as described herein, may be software applications that can run automated tasks (scripts). For example, the agents may be software applications that can read and/or write data to one or more devices of the system. In one embodiment, the agents may be able to generate their own software, and inject the software into one or more device it is associated with. The agents may further be capable of communicating with other agents, as will be described in more detail below, along with a more detailed description of the agents generally. The agent generator 522 may generate an agent based on information received from the adaptive interaction manager 506. In some embodiment, the agents are generated to perform a defined task. In other embodiments, the agents are generated to perform a defined set of tasks. In still further embodiments, the agents are generated having a desired goal, and allowed to determine how to meet the desired goal. In some examples, a generalized framework can be provided to a generated agent to provide constraints as to how the goal may be achieved. In further embodiments, the agent generator 522 may modify an existing agent. For example, the agent generator 522 may modify an existing agent to provide more functionality. In other examples, the agent generator 522 may update the agent with additional information related to the device the agent is associated with, such as a new firmware ("FW") update, or additional hardware (e.g. a new I/O board for a controller).

The agent generator 522 may communicate the generated agents to the BMS 525 via a BMS interface 528. The BMS interface 528 may be a serial interface, such as RS-232 or RS-485. In one embodiment, the BMS interface 528 is a universal asynchronous receiver/transmitter ("UART"). In other examples, the BMS interface 528 may be a wireless interface such as cellular, Wi-Fi, Zigbee, Bluetooth, RF, LoRa, etc. Additionally, the BMS interface 528 may include other wired interfaces such as USB, Firewire, Lightning Connectors, CAT5 (wired internet), etc. The agent generator 522 may further communicate the generated agents to the system 500 via an adaptive interaction manager interface 530. The adaptive interaction manager interface 506 may allow the agent generator 522, as well as the processing circuit 504 in general, to communicate with the adaptive interaction manager 506 via a corresponding processing circuit interface 532. Similar to above, the adaptive interaction manager interface 530 may be a serial interface, such as RS-232 or RS-485. In one embodiment, the adaptive interaction manager interface 530 is a UART interface. In still other examples, the adaptive interaction manager interface 530 may be a wireless interface such as cellular, Wi-Fi, Zigbee, Bluetooth, RF, LoRa, etc. Additionally, the adaptive interaction manager interface 530 may include other wired interfaces such as USB, Firewire, Lightning Connectors, CAT5 (wired internet), etc.

In some embodiments, the adaptive interaction manager 506 provides communication between one or more I/O devices 534, one or more cloud-based applications 518, the processing circuit 504 and one or more devices, such as the BMS controller 526. The adaptive interaction manager 506 is shown in include a user interface 536 for communicating with the one or more I/O devices 534. In one embodiment, the user interface 536 may be a wireless interface such as cellular (3G, 4G, LTE, CDMA, etc.), Wi-Fi, Zigbee, Bluetooth, RF, LoRa, etc. Additionally, the user interface 536 may include other wired interfaces such as USB, Firewire, Lightning Connectors, CAT5 (wired internet), UART, serial (RS-232, RS-485), etc. The I/O devices 534 may be any device capable of communicating to the adaptive interaction manager 506, as well as providing a device for a user 538 to interface with the system 500. Example I/O devices 534 may include personal computing devices such as smart phones (iPhone, Android phone, Windows phone), tablet computers (iPad, Android Tablet, Windows Surface, etc.), laptop computers, and/or desktop computers. Example I/O devices may further include a stand-alone device such as an Amazon Echo, or even a non-mobile device such as a voice capable thermostat, or other dedicated I/O devices.

The adaptive interaction manager 506 may communicate with the cloud-based applications 518 via a network interface 540. The network interface 540 may be an internet based interface, such as Wi-Fi, CAT5, cellular (3G, 4G, LTE, CDMA, etc.), etc. However, other interfaces, such as Zigbee, Bluetooth, RF, LoRa, etc., are also considered. In one embodiment, the adaptive interaction manager 506 may communicate with the cloud-based applications 518 via one or more APIs 542. In one embodiment, the APIs 542 are proprietary APIs for interfacing the adaptive interaction manager 506 with the cloud based applications 518. In one example, the APIs 542 can be web hosted APIs provided by a third party provider, such as Amazon Cloud Services, Google, Apple, Microsoft, etc. In some embodiments, the APIs 542 interface with a proprietary voice recognition application, such as a voice recognition application from Johnson Controls. In other examples, the APIs 542 can interface with gesture recognition APIs, such as those from Johnson Controls. Further examples of possible APIs 542 can include enterprise resource planning (ERP), or other enterprise management software APIs for interfacing with a company or facility enterprise system (e.g. SAP). Other possible APIs 542 may include e-mail and/or calendaring interface APIs, for interfacing with an e-mail/calendaring system such as Microsoft Outlook, Apple Mail, Google Gmail, Lotus Notes, etc.

In one embodiment, the APIs 542 interface with the cloud-based applications 518. The cloud based applications 518 may be supplied by third parties. For example, the cloud based applications 518 may include voice to text applications, such as Amazon Voice Services, Google Voice, Apple's Siri, or Microsoft's Cortana. The cloud based applications 518 may further include gesture recognition applications such as those used by Microsoft Kinect. Further, other cloud based applications 518 can include personal assistant applications such as Apple's Siri, and Microsoft's Cortana. By utilizing one or more cloud based applications on a remote server, the system 500 can leverage more sophisticated and powerful contextual data processing technology than would be applicable to install on an individual server, system, or device. For example, cloud based voice recognition applications can provide as high as 95% natural voice recognition accuracy. In other embodiments, the cloud-based applications 518 may include a natural language processor 519. The natural language processor 519 may be a voice to text application, such as those described above. In other embodiments, the natural language processor 519 may be used to processes natural language text into computer executable commands. For example, the natural language processor 519 may be able to analyze text provided to the system 500, such as via e-mail or text message, and process the natural language text into a format readable by the controller 502. While the natural language processor 519 is shown as part of the cloud-based applications 518, it is considered that the natural language processor 519 may be separate from the cloud based applications 518, and communicate directly with the adaptive interaction manager 506. In further embodiments, the natural language processor 519 may be integrated into the controller 502.

The adaptive interaction manager 506 may further be in communication with one or more systems or devices associated with a facility or building. As shown in FIG. 5, example systems and devices can include a BMS controller 526. The adaptive interaction manager 506 may communicate with the system via a system interface 544. The system interface 544 may be a serial interface, such as RS-232 or RS-485. In one embodiment, the system interface 544 is a UART interface. In still other examples, the system interface 544 may be a wireless interface such as cellular, Wi-Fi, Zigbee, Bluetooth, RF, LoRa, etc. Additionally, the system interface 544 may include other wired interfaces such as USB, Firewire, Lightning Connectors, CAT5 (wired internet), etc. While FIG. 5 shows the adaptive interaction manager 506 communicating with a BMS controller 526 of the system 500, the adaptive interaction manager 506 may communicate with communicate with any device associated with the BMS 525. For example, the adaptive interaction manager 506 may be able to interface with the BMS controller 526, one or more intermediate devices 546, and/or one or more local device 548. Example intermediate devices may include device controllers, sub-system controllers, RTU's, AHU's, etc. Example local devices may include thermostats, valves, switches, actuators, etc. In one embodiment, system interface 544 may communicate with the BMS 525 via a network connection, such as a BACnet network connection. However, other networks, such as Ethernet, Local Area Network, etc., are also considered.

The adaptive interaction manager 506 may further interact with other systems associated with the BMS 525. Example system may include an e-mail calendaring server 550, a security system 552, etc. Via the BMS 525, the e-mail calendaring server 550, the security system 552, and/or other systems may all provide data to the adaptive interaction manager 506, which can process the information, as will be described in more detail below. In one embodiment, the e-mail calendaring server 550, the security system 552, and/or other systems may provide contextual data to the adaptive interaction manager 506. In one embodiment, the adaptive interaction manager 506, via the system interface 544, communicates with the one or more systems or devices using one or more network connections. For example, the network connections may include a wired connection to the internet. However, other network connections are contemplated such as wireless connections such as cellular, Wi-Fi, Zigbee, Bluetooth, RF, LoRa, etc. Additionally, other network connections such as serial connections (RS-485, RS-232, USB), or other connections such as Firewire, Lightning Connectors, etc. may be used.

The e-mail/calendaring server 550 may be a third party e-mail/calendaring server, such as a Microsoft Exchange server. In one embodiment, the e-mail/calendaring server 550 processes the calendars and schedules for the employees of a facility, as well as for physical areas of the facility. For example, the e-mail/calendaring server 550 may processes scheduling for conference/meeting rooms, as well as certain technology such as projectors, video conference equipment, etc. In one embodiment, the e-mail/calendaring server 550 provides information such as schedules to the adaptive interaction manager 506. Further, the e-mail/calendaring server 550 may allow access to e-mails by one or more cloud-based application 518 such as the personal assistant applications described above. The personal assistant applications may be able to extract contextual information from the data provided by the e-mail/calendaring server 550 and provide the contextual information to the adaptive interaction manager 506 via an API 542.

The security system 552 may include multiple elements associated with a facility or building security system. For example, the security system 552 can include multiple devices such as cameras, microphones, motion detectors, thermal sensors, access devices (RFID locks, biometric locks, etc.), entry logs, etc. In one embodiment, the security system 552 provides data to the adaptive interaction manager 506. The data may include occupancy data provided by the motion detectors and/or thermal sensors. Further, the data may include video and/or digital images provided by the cameras. In one embodiment, the digital images may be provided to the cloud-based application 518 for processing via the adaptive interaction manager 506. For example, the cloud-based application 518 may be a gesture recognition application, such as Microsoft Kinect.

Figure 6:
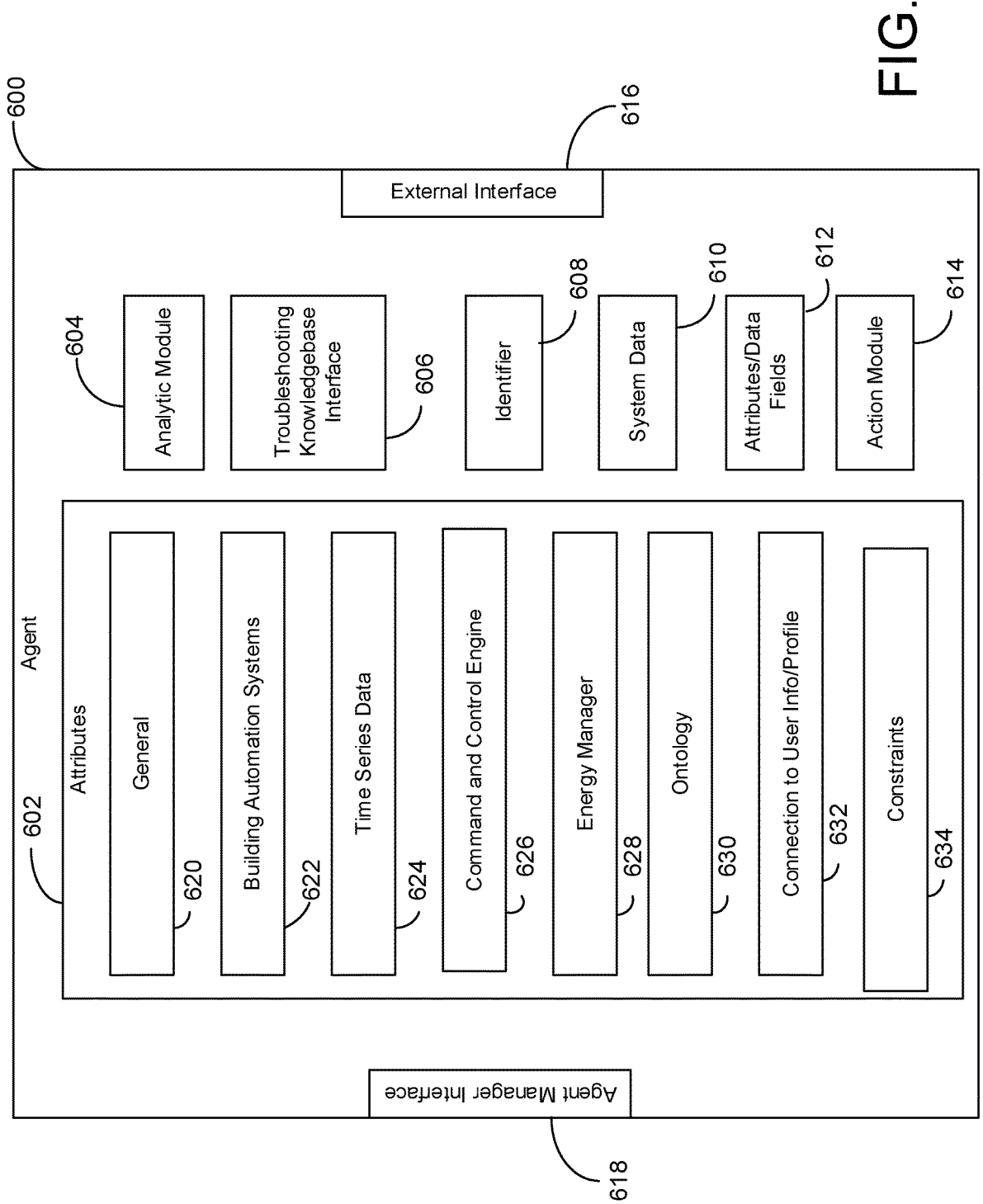
FIG. 6 is a block diagram illustrating an agent that is part of the control system of FIG. 5, according to some embodiments.

Turning now to FIG. 6, a block diagram of a generated agent 600 is shown, according to some embodiments. The agent 600 may include a number of attributes 602, an analytic module 604, a troubleshooting knowledgebase interface 606, an identifier module 608, a system data module 610, an attributes/data field module 612, and an action module 614. The agent 600 may further include an external interface 616 and an agent manager interface 618. The attributes 602 may be a number of connections and/or functions available to the agent 600. As shown in FIG. 6, the agent 600 may include a general attribute 620, a building automation systems (BAS) attribute 622, a time series data attribute 624, a command and control engine attribute 626, an energy manager attribute 628, an ontology attribute 630, a user info/profile attribute 632, and a constraints attribute 634. The attributes 602 may be used, in conjunction with the other elements of the agent 600 described above, by the agents to perform their designated operations. For example, the attributes 602 can include rules, permissions, historical data, etc. which can be used to perform designated tasks by the agent 600. In one example the attributes 602 are located within the agent 600. In one embodiment, the attributes 602 simply provide for data access to the information associated with the attributes 602. The information associated with the attributes 602 may be gathered and provided by a central processing server, such as those described above.

The general attribute 620 may include information such as schedules (i.e. operating schedules, PM schedules, occupancy schedules, etc.), environmental conditions (e.g. temperature, humidity, weather, etc.) time, date, or other relevant general information. In one embodiment, the general attributes 620 are connected to external sensors, services, or databases. In one embodiment, the general attributes 620 may be provided by a controller, such as controller 502 described above. The controller 502 may have access to various services which can provided the general attributes 620 to the agent 600. Alternatively, the agent 600 may have access to the same sensors and services that the controller 502 may have. For example, the agent 600 may be able to access weather information by communicating with one or more environmental sensors in a BMS. In other examples, the agent 600 may have access to the internet and can access weather information from known weather websites relevant to the location of the BMS, (e.g. Yahoo Weather, Weatherbug, etc.). Alternatively, BMS influencers such as weather, and access to the internet of other cloud-based applications may be provided by the adaptive interaction manager 506, as described above.

The BAS attributes 622 may include or have access to general building information such as layouts. The BAS attributes 622 may further include or have access to information relating a BMS associated with the building, including control schemes, device information, etc. Further, the BAS attribute 622 may have access to scheduling information relating to certain assets for the building. For example, the BAS attribute 622 may have access to schedules for one or more conference rooms associated with the building. Additional schedules, such as building occupancy schedules may also be accessed by the BAS attributes 622. The time series data attribute 624 may provide access to long term data records related to multiple functions associated with a building. In one embodiment, the time series data may be stored on a database, such as database 516 above, and accessed by the time series data attribute 624. The time series data attribute 624 may be accessed by a training module or a task-conditioning module, such as those described above, to allow the agent 600 to make decisions based on long term historical data. The command and control engine attribute 626 may include the necessary data, including permissions, to allow the agent 600 to perform control actions in addition to only monitoring actions.

The energy manager attribute 628 may include an enterprise optimization system (EOS). The EOS may allow for direct communication with a utility provider such as a water company, a power company, water treatment plant, etc. to allow the agent 600 to determine parameters such as utility rates, peak demand times, potential brown outs, etc. The energy manager attribute 628 may further allow for communication with distributed energy storage (DES) systems. The connections associated with the energy manager attribute 628 allow the agent 600 to manage energy usage for a facility, building, or even an individual room within a building. The ontology attribute 630 may provide a hierarchical listing of all the items within a given facility or building. Items may include one or more BMS devices (controllers, HVAC equipment, AHUs, VAVs, etc.), lighting, A/V resources, rooms, utilities, etc. In one embodiment, the ontology attribute 630 provides spatial locations and configurations of BMS devices within a building or facility. The ontology attribute 630 may further provide attributes between one or more BMS devices and an area of the building or facility. For example, the ontology attribute 630 may provide information such as "damper BX1F affects area XYZ of building Q." In one embodiment, the ontology attribute 630 may have access to the database 516, which may contain ontology data relating to a BMS, such as BMS 525.

The connection user info/profile attribute 632 may include permissions associated with individual users. The connection user info/profile attribute 632 may further include other information about the user, such as workspace location, work schedule, direct reports, supervisor, listed skills, maintenance responsibilities, etc. The above attributes examples are exemplary only, and it is contemplated that more attributes or fewer attributes may be used in the agent 600, as required. Finally, the constraints attribute 634 may include constraints applied to the agent. In one embodiment, the constraints can be implemented by the agent generator 522 during generation of the agent 600. In some embodiments, the constraints are system based. For example, the constraint attributes 634 may include BMS related constraints such as fault tolerances, communication capabilities, etc. Example communication capability restrictions may include constraints based on system communication types (mesh, P2P, hierarchical, etc.). Further communication capability constraints may include baud rates, latency, bandwidth, etc. The constraint attributes 634 may further include information system constrains such as system storage capacity, system and/or device processing capability, timing and synchronization of data to the system, etc.

The analytic module 604 may be a computational module capable of analyzing data received via the agent manager interface 618, or from the system via the external interface 616. While FIG. 6 shows only a single analytic module 604, it is contemplated that multiple analytic modules 604 may be located within a single agent 600. In some embodiments, an analytic module 604 can be created for each type of data received by the agent 600. In other embodiments, an analytic module 604 may be created for each function or analysis function assigned to the agent. In some embodiments, the agent 600 may generate analytic modules 604 dynamically to better analyze data, or perform functions based on dynamically changing inputs. For example, the agent may detect a fault or other abnormal data pertaining to a BMS device. The agent 600 may then create an new analytic module 604 to receive the data and provide additional analysis.

The troubleshooting knowledgebase 606 may provide a connection to a troubleshooting knowledgebase stored on a database, such as database 516. The troubleshooting knowledgebase interface 606 may allow the agent 600 to access data and information provided over time by multiple agents, as well as by user such as service personnel, administrators, smart devices, etc. For example, the agent 600 may access one or more knowledgebases via the troubleshooting knowledgebase interface 606 to obtain historical data regarding maintenance for a given device or system. The troubleshooting knowledgebase interface 606 may therefore provide agents with historical maintenance data as well as previous solutions presented by the problems. In one embodiment, the agent 600 may use one or more analytic modules 604 to analyze data received by troubleshooting knowledgebase interface 606 to help provide more helpful information to a user. For example, the agent 600 may perform a statistical analysis on the historical data received via the troubleshooting knowledgebase interface 606, such as a Monte Carlo analysis. This may be used to provide probabilities regarding possible problems and solutions with a given BMS device or system. The troubleshooting knowledgebase interface 606 may allow the agent 600 to analyze the historical data to perform problem categorization. Problem categorization may allow the agent 600 to analyze similar historical problems similar to the current problem and provide data and/or suggestions to a user.

In some embodiments, multiple agents may be used in parallel to perform certain actions. For example, multiple agents may be used to address a problem by generating a hypothesis, and then subsequently testing the hypothesis. By using multiple agents, the workload can be spread out among multiple systems to allow for quicker analysis of data. In some examples, the parallel Agents can use a divide and conquer technique to perform complex tasks more efficiently. For example, multiple Agents can be generated to address a potentially faulty device. In one example, the Agents are generated only as needed. Furthermore, the parallel agents can communicate with each other to build upon the information gathered/learned by an individual agent, thereby allowing for more effective performance by the parallel agents as a whole.

The identifier module 608 may include identification data related to the generated agent 600. In one embodiment, the identifier module 608 can include a name and/or an address for the agent 600 within the system. In some embodiments, the agent 600 can generate its own address to allow for integration into an ad hoc network. In some embodiments, the identifier module 608 may include other identification data of the agent 600, such as assigned functionality, associated devices, communication protocol, size (e.g. kb, Mb, etc.), etc. In some embodiments, the data contained within the identifier module 608 may allow other agents in the system 500 to identify each other. This can be advantageous where multiple agents are present in a system, and or parallel agent architectures are implemented.

The system data module 610 may include information regarding the devices in the system 500. Further, the system data module 610 may include information such as communication protocols used between devices, the communication architecture (mesh, P2P, hierarchical), available communication ports, etc. The system data module 610 may further provide communication data such as required handshaking for communication between devices, and or in-kind communications. The system data may further include information relating to other active agents.

The attributes/data fields module 612 may include attributes of the agent 600. In some embodiments, the attributes can be those attributes provided by the agent generator 522 during the generation of the agent 600. In other embodiments, the attributes can be learned attributes. In some embodiments, the agent 600 can be configured to learn attributes over time. Example learned attributes may include report formats, data values, etc. The attributes/data fields module 612 may further include values received via the external interface 616 from the system, or via the agent manager interface 618. In some embodiments, the values are sensed values, such as those provided by various sensing devices within a system. For example, voltage sensors, current sensors, temperature sensors, pressure sensors, etc., may all provide sensed values to the agent 600. The values may also be inferred values. In one example, the analytic module 604 may analyze one or more measured values provided by the attributes/data fields module 612 and infer one or more values associated with the measured values, and store the inferred value in the attributes/data fields module 612. For example, the analytic module 604 may receive a measured current flow value (Amps) associated with a coil of an actuator from the attributes/data fields module 612. The analytic module 604 may then infer a temperature of the actuator, and provide that inferred data to the attributes/data fields module 612.

Finally, the agent may include an action module 614. The action module 614 may generate outputs that can be output via the external interface 616 and/or the agent manager interface 618. For example, the action module 614 may output a changed setpoint to a device in the BMS via the external interface 616. In one embodiment, the action module 614 may change the setpoint based on data provided by the analytic module 604, the troubleshooting knowledgebase interface 606 and/or one or more of the attributes 602. In other embodiments, the action module may output data to a user via the agent manager interface 618. For example, the action module 614 may generate a report to be provided to a user, which can be communicated to the adaptive interaction manager 506 via the agent manager interface 618. The adaptive interaction manager 506 may then output the report to a user via one or more of the I/O devices 534. In one embodiment, the agent manager interface 618 may provide direct communication to the agent manager 514. In other embodiments, the agent manager interface 618 may communicate with the agent manager 514 via a communication link to the adaptive interaction manager 506. The above modules and attributes shown within agent 600 are exemplary only, and it is considered that more modules/attributes and/or less modules/attributes may be present in an agent.

Intelligent PIC Valves with Agent Interaction

Smart buildings are buildings that are able to intelligently manage an indoor environment of the building to optimize the environment for occupant comfort, safety, security, productivity and energy efficiency. Control strategies implemented during the design and commissioning phases are usually designed to meet comfort and efficiency outcomes. The comfort and efficiency outcomes are generally established based on a set of assumed parameters regarding the usage of the building, equipment configurations, building codes, stated preferences, and the like. The goal of maintaining and achieving comfort and efficiency outcomes may be continuously challenged due to the certain parameters. The parameters may include: unplanned and variable occupancy and usage of the space; interdependencies of control sub-systems within the building and across a set of buildings depending on configuration of the chiller plant, optimization technologies, equipment settings and integrated auxiliary systems; and manual interventions in case of alarms, equipment replacement, service, and occupant request which could affect initial configurations.

Generally, to achieve the above described optimizations, consultants specializing in optimizations were used during installation to optimize the various systems. These consultants may have used hardware driven tools to configure the system and relied on terminal points when optimizing the system. Further, continuous commissioning processes utilizing data-driven analytics and ongoing performance monitoring of inputs may be used to drive configuration changes and thereby to drive up efficiency. The continuous commissioning process may have an emphasis on energy and operational savings.

The above solutions, while workable, require high levels of competency and experience in a facility management team in order to provide effective returns. This may be especially true in that the above solutions generally have high up-front costs. For HVAC product and service companies, this may be a viable business model, but far too costly to operate due to intensive high-cost manual investments for creating smart analytics, diagnostic rulesets and prove out benefits using tons of historical data. Additionally, the challenge in applying optimization routines to legacy building and legacy equipment continues to be a gap in what the HVAC industry can offer and prevents these buildings from achieving the level of efficiency and environmental impact.

The solution for the above listed challenges may generally need to operate based on the following assumptions: 1. The solution works with simple low cost hardware alternatives in the space of valves, actuators, controllers and large equipment (chillers, AHU, fan coils, etc.); 2. The solution works with simple low cost software routines that can be physically deployed to an edge device, controller, or cloud based routine depending on cost and fitment to current architecture; 3. The solution can be deployed on legacy buildings and building systems; 4. The solution does not require manual intelligence and intervention to adapt to changing systemic condition, occupancy/usage conditions or weather conditions; 5. The solution is able to exist in an ecosystem of connected and co-dependent sub systems and smart technologies; and 6. The solution is able to scale from small spaces to large building and further to smart campus and district level controls implementation.

In one embodiment, the solution may be based on using artificial intelligence using agent based technologies. The use of agent based technologies in a smart building or HVAC system is described in U.S. patent application Ser. No. 15/367,167, "Systems and Methods for Agent Interaction with Building Management System," filed Dec. 1, 2016, and is herein incorporated by reference in its entirety. Generally, an agent is a self-contained program capable of controlling its own decision making and actions. The agent may base its decisions and actions based on a perception of the environment, or in pursuit of one or more objectives. Key characteristics of software agents that are of interest and applicability are as follows: Autonomy—the ability to function largely independent of human interference; social ability—ability to interact intelligently and constructively with other agents and/or humans; responsiveness—ability to perceive the environment and respond in a timely fashion to events occurring in the environment; and pro-activeness—an ability to take initiative whenever the situation demands.

The above characteristics may be combined with self-learning technologies, adaptive interactions, and integration with critical human-machine interface (HMI) touch points, a multi-agent system may be an ideal solution for creating a smart, self-adapting, continuously optimizing system that can be deployed at scale. A conditioned water flow system may include an electronic pressure independent valve (NV). The PIV control valve is used to provide a specific flow of water to a coil used in HVAC equipment in order to condition air. The advantage of pressure independent control valves is that they simplify the design process for HVAC control system engineers because they provide a predictable flow of water in pipes. The drawback of a pressure independent control valve is that the additional mechanical complexity required to regulate flow increases the cost of the valve when compared to traditional ball or globe valves. However, traditional ball and globe valves increase the complexity of designing a water loop for HVAC equipment because a pressure drop occurs across each valve and changes the amount of water flowing in the pipe. Designing systems that compensate for the pressure drop across each valve forces HVAC control system engineers to select each valve based on the size of the pipe and with the necessary flow characteristics to meet system requirements. Traditional valves can also require the installation of additional balancing valves throughout a water loop to manage the water flow rates. On top of these system design challenges, buildings do not typically operate within the specific design conditions. Once the valve is installed, the pressure drop characteristics cannot be adjusted with the dynamic building environment. This can result in occupants experiencing decreased comfort levels when traditional valves are chosen over pressure independent valves.

Figure 7:
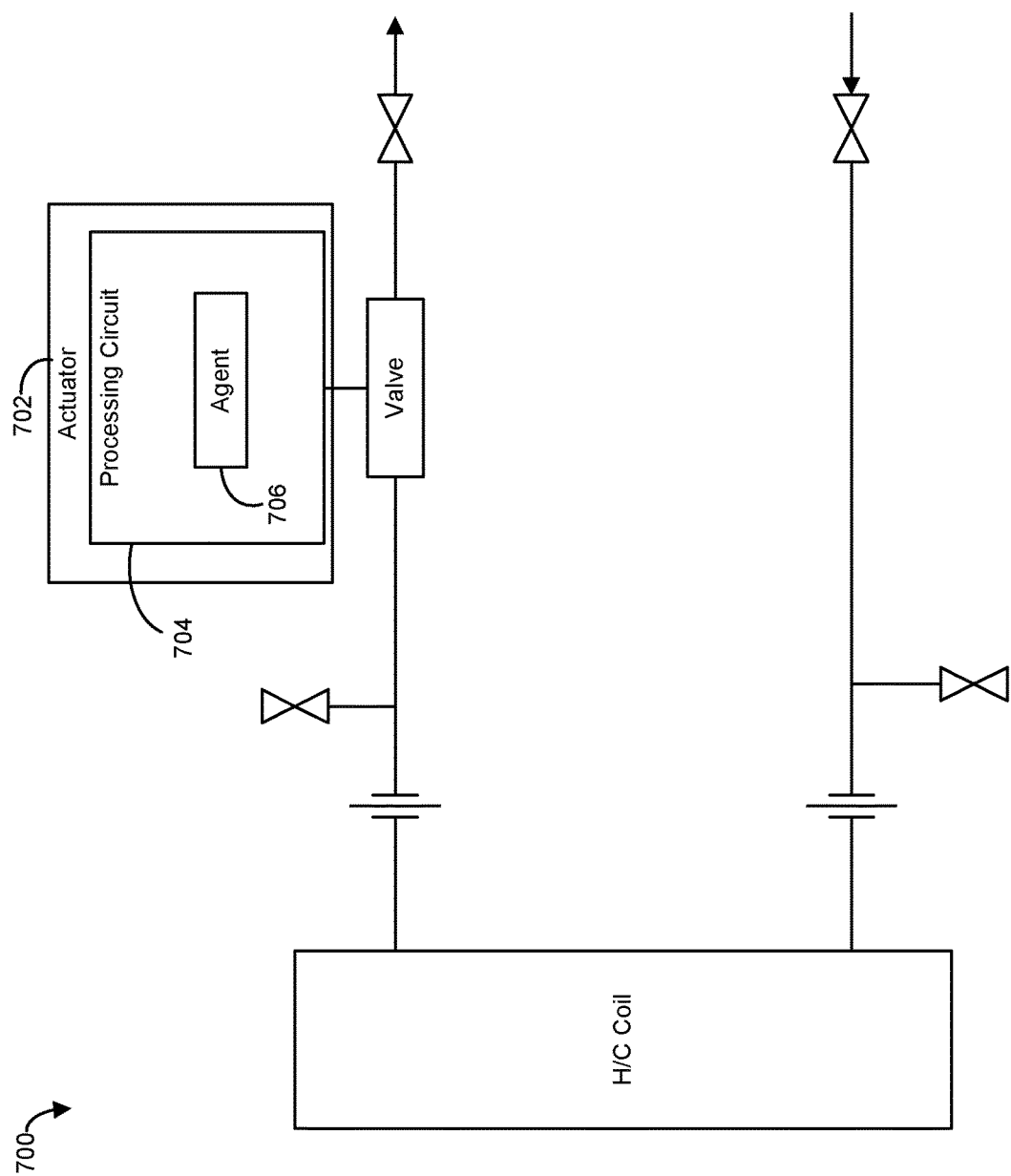
FIG. 7 is a block diagram of a fluid flow system with an intelligent flow control device, according to some embodiments.

Turning now to FIG. 7, an improved system 700 is shown, according to some embodiments. In FIG. 7, an actuator 702 in communication with a valve is shown. The actuator 702 may include a processing circuit 704. The processing circuit 704 may include a processor and a memory. The processor may be a general purpose or specific purpose processor, an application specific integrated circuit (ASIC), one or more field programmable gate arrays (FPGAs), a group of processing components, or other suitable processing components. The processor may be configured to execute computer code or instructions stored in memory or received from other computer readable media (e.g., CDROM, network storage, a remote server, etc.).

The memory may include one or more devices (e.g., memory units, memory devices, storage devices, etc.) for storing data and/or computer code for completing and/or facilitating the various processes described in the present disclosure. The memory may include random access memory (RAM), read-only memory (ROM), hard drive storage, temporary storage, non-volatile memory, flash memory, optical memory, or any other suitable memory for storing software objects and/or computer instructions. The memory may include database components, object code components, script components, or any other type of information structure for supporting the various activities and information structures described in the present disclosure. The memory may be communicably connected to the processor and may include computer code for executing (e.g. by processor) one or more processes described herein.

The processing circuit 704 may include an integrated software agent 706. The agent can be used to accomplish the same tasks as the PIV described above, but with reduced mechanical complexity. The agent 706 may use data from a temperature sensor in the valve body to approximate water flow for controlling the flow of water through the valve by adjusting the position of the actuator. Further, the use of an intelligent agent, such as agent 706, in combination with the actuator can remove the need for additional flow sensors to be installed, which are generally required for a PIV valve to operate correctly. Instead, the agent 706 may monitor a heated thermistor or other temperature sensing device in the valve body, and can subsequently approximate a flow in the valve using advanced mathematics. This flow calculation by the agent 706 can remove the need for additional flow sensors in the system, for example. Additional sensors may also be included in this configuration.

Figure 8:
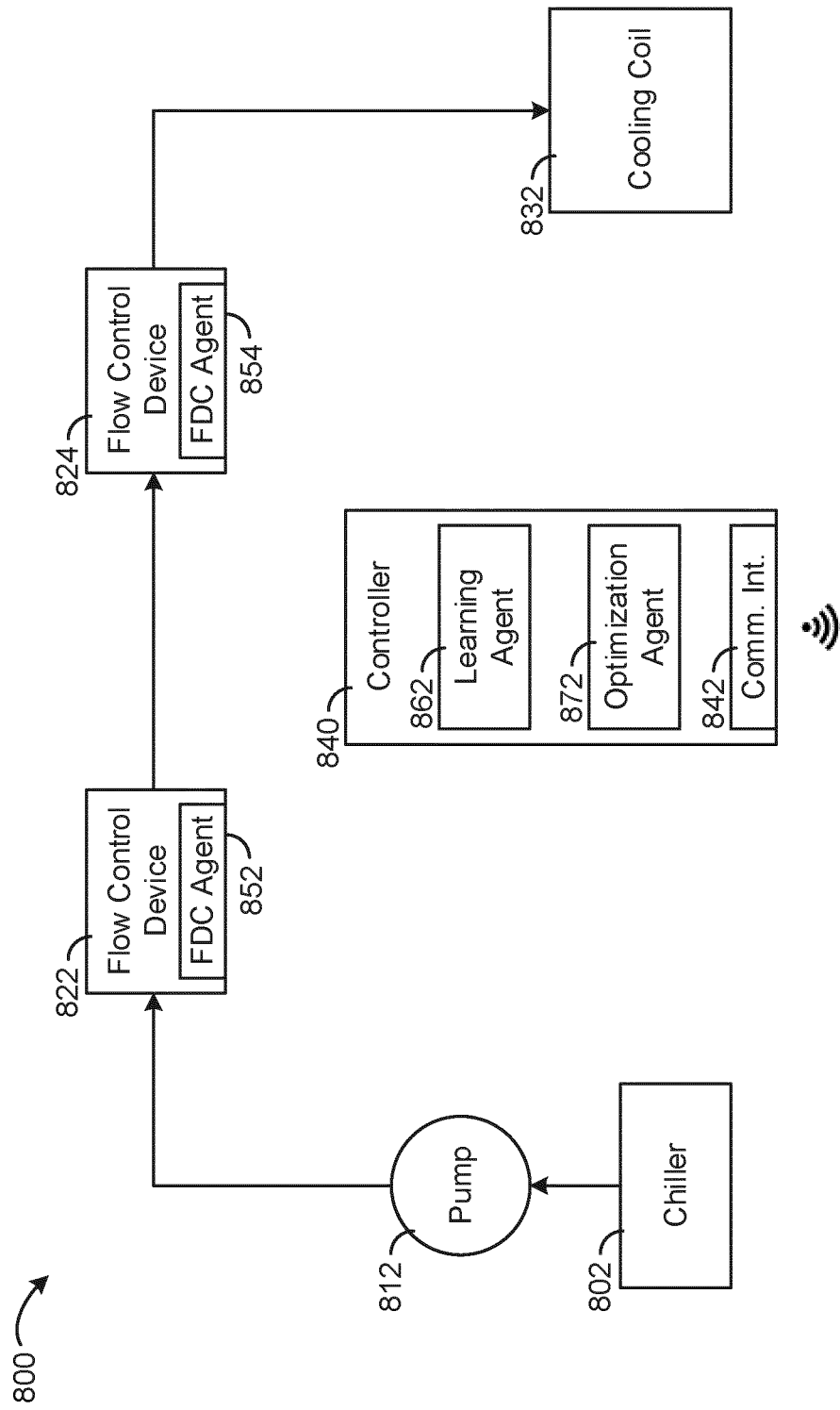
FIG. 8 is a block diagram of a flow control system with intelligent flow control devices, according to some embodiments.
Figure 9:
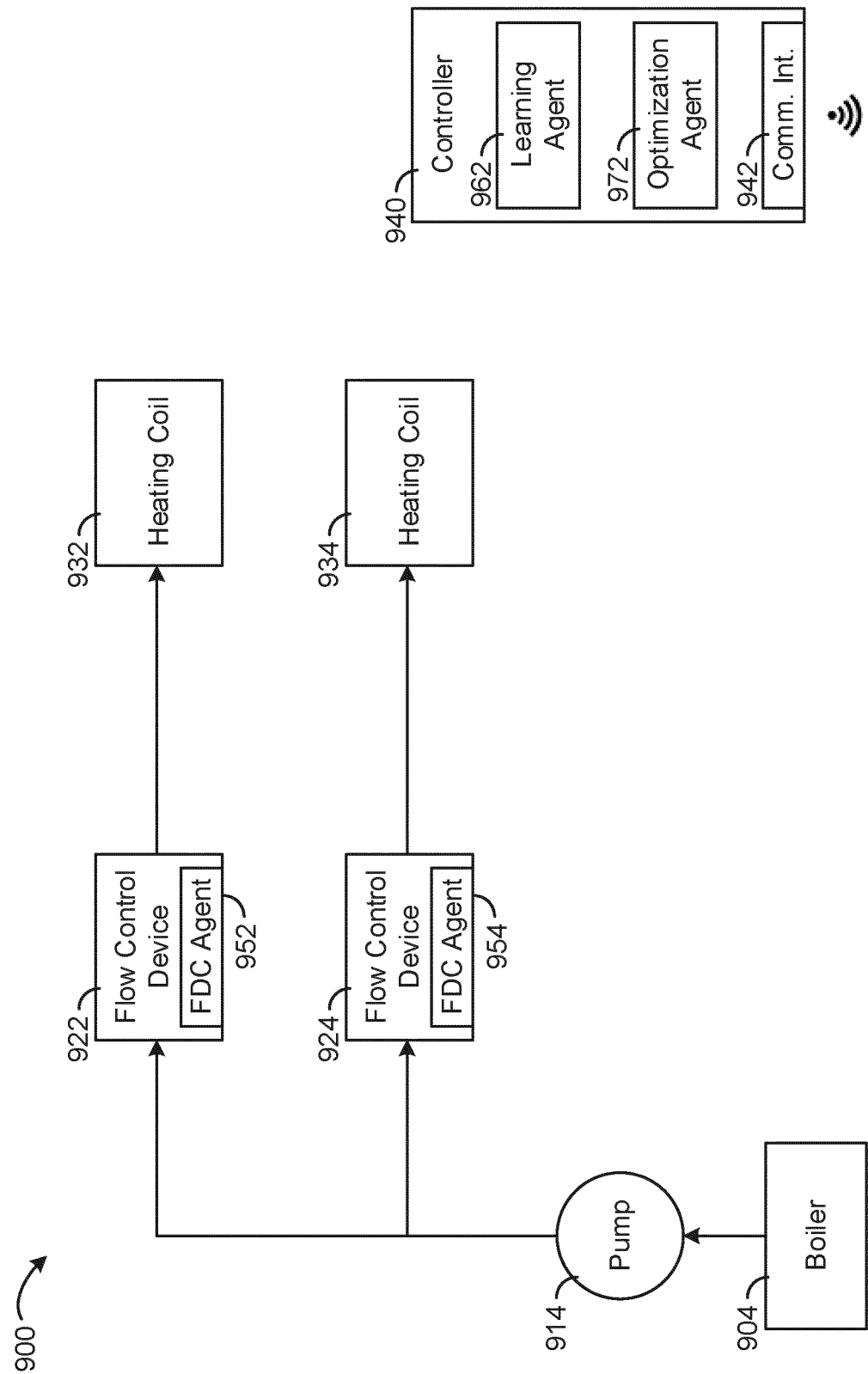
FIG. 9 is another block diagram of a flow control system with intelligent flow control devices, according to some embodiments.
Figure 10:
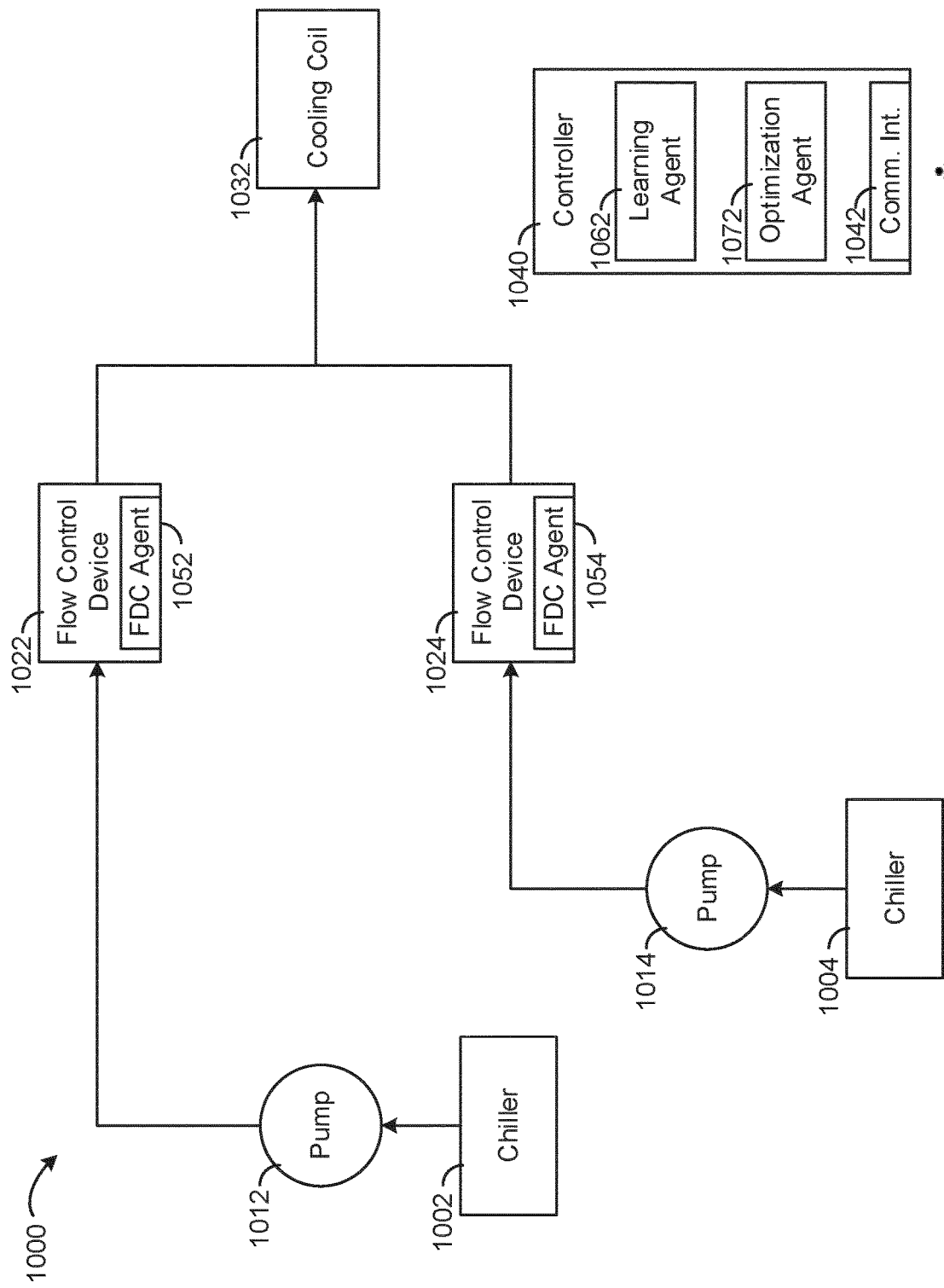
FIG. 10 is another block diagram of a flow control system with intelligent flow control devices, according to some embodiments.

Turning now to FIGS. 8-10, three example systems 800, 900, and 1000 in which an intelligent flow control device can be implemented are shown, according to some embodiments. The intelligent flow control device is configured to control fluid flow in HVAC system 100 and includes a valve, one or more sensors, and an actuator configured to open and close the valve. In some embodiments, the flow control device is the device shown in FIG. 7 (i.e., actuator 702, processing circuit 704, agent 706, and valve). Flow control systems 800, 900, and 1000 can provide efficient and effective fluid flow control in system 100. For example, various software agents such as a fault detection and correction agent, a learning agent, and an optimization agent can be configured to dynamically adjust various system parameters. Each of the agents described below are analogous to agent 600 described above. Systems 800, 900, and 1000 are meant to be exemplary and it should be noted that different configurations as well as more complex systems are contemplated within the scope of the present disclosure.

Turning now to FIG. 8, an example flow control system 800 is shown, according to some embodiments. System 800 is shown to include a chiller 802 and a pump 812. Chiller 802 may be analogous to chiller 102 and pump 812 may be analogous to pumps 234 and 236, for example. Chiller 802 is configured to produce chilled fluid and pump 812 is configured to circulate the chilled fluid to a cooling coil 832. The chilled fluid is circulated through piping (e.g., piping 108) and passes through two flow control devices 822 and 824 before arriving at cooling coil 832. Cooling coil 832 may be located in an air handler (e.g., AHU 106), for example, and is involved in a heat exchange process similar to cooling coil 334 described above. Flow control devices 822 and 824 operate in series in order to provide chilled fluid to cooling coil 832. Devices 822 and 824 each include a valve, one or more sensors (e.g., thermistor embedded in valve), and an actuator configured to open and close the valve. The actuators may include a processing circuit comprising a software agent configured to receive data from the one or more sensors and generate control signals (e.g., "effectors") used to operate the valve.

System 800 is also shown to include a controller 840 including a communications interface 842. Controller 840, for example, may be any of controllers 330, 336, 502, or 526 described above. Controller 840 may also be a separate controller configured to interact with at least the equipment shown as part of system 800. Communications interface 842 can be configured to facilitate wireless and/or wired communication with chiller 802, pump 812, flow control devices 822 and 824, and/or cooling coil 832. Controller 840 is also shown to include a learning agent 862 and an optimization agent 872. Learning agent 862, for example, can be configured to receive data from one or more sensors associated with flow control devices 822 and 824. Learning agent 862 can use this data to develop and train a model for each flow control device as well as the system as a whole. In some embodiments, learning agent 862 uses a system identification process to generate these models upon installation of the system. Optimization agent 872 can also receive data from flow control devices 822 and 824. Optimization agent 872 can use this data from both flow control devices in order to determine an optimal position of each of the valves.

In addition, flow control device 822 is shown to include a fault detection and correction agent 852 and flow control device 824 is shown to include a fault detection and correction agent 854. FDC agents 852 and 854 can be configured to receive data from sensors in order to detect whether one or more faults have occurred in system 800. For example, FDC agents 852 and 854 can detect a fault if a reading from a temperature sensor, pressure sensor, or flow sensor is out of bounds. FDC agents 852 and 854 along with learning agent 862 and optimization agent 872 provide system 800 with dynamic control functionality. More detail regarding these agents is presented below with respect to FIGS. 11-13.

Turning now to FIG. 9, another example flow control system 900 is shown, according to some embodiments. System 900 includes a boiler 904 configured to produce heated fluid and a pump 914 configured to circulate the heated fluid through piping to two heating coils 932 and 934. System 900 includes two flow control devices 922 and 924 configured to control the flow of heated fluid through the piping. Devices 922 and 924 operate in parallel with a common intake of heated fluid from boiler 904. Device 922 is configured to control the flow of heated fluid to heating coil 932 and device 924 is configured to control the flow of heated fluid to heating coil 934. Boiler 904 may operate in a manner similar to boiler 104 and pump 914 may operate in a manner similar to pumps 222 and 224, for example. Heating coils 932 and 934 may be located in an air handling unit (e.g., AHU 106).

Turning now to FIG. 10, another example flow control system 1000 is shown, according to some embodiments. System 1000 includes two flow control devices 1022 and 1024 that receive chilled water from two separate chillers. Devices 1022 and 1024 are configured to operate in parallel with a common discharge that provides chilled fluid to a cooling coil 1032. In this manner, devices 1022 and 1024 can use the supply of chilled water from two separate chillers 1002 and 1004 to provide cooling coil 1032 with a desired amount of chilled fluid. The chilled fluid can be circulated through the system by pumps 1012 and 1014. Similar to systems 800 and 900, system 1000 is shown to include a controller 1040 with a learning agent 1062, an optimization agent 1072, and a communications interface 1042. Flow control devices 1022 and 1024 are shown to include FDC agents 1052 and 1054, respectively.

Figure 11:
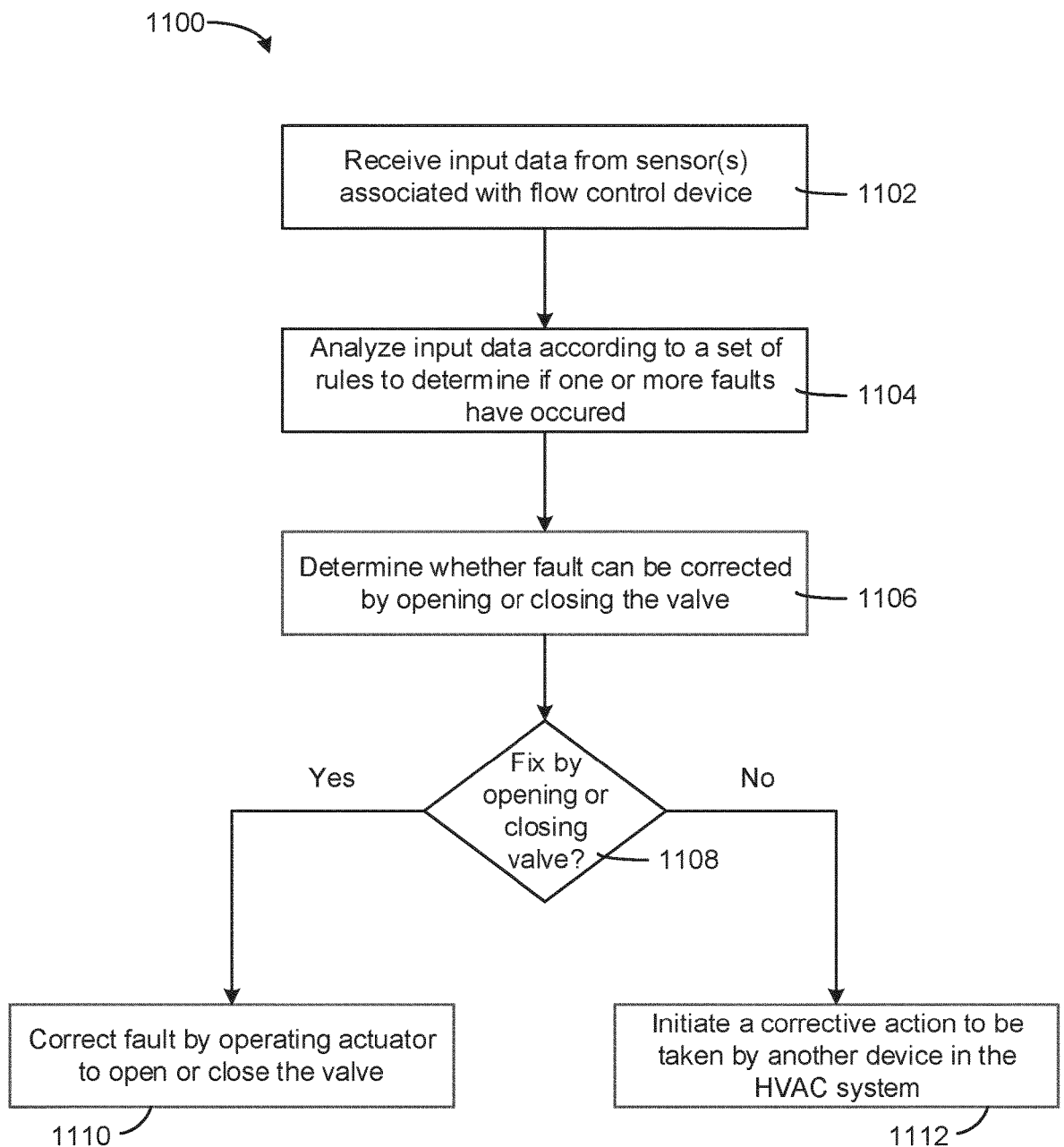
FIG. 11 is a flow diagram of an agent based flow control process, according to some embodiments.

Referring now to FIG. 11, a flow diagram of an agent based flow control process 1100 is shown, according to some embodiments. Process 1100 can be used in HVAC system 100 and can be performed by adaptive agent control system 500, for example. In some embodiments, process 1100 is performed by a fault detection and correction agent as described above (e.g., agents 852, 854, 952, 954, 1052, and 1054). Process 1100 can allow a flow control system to adaptively detect and correct faults, thus allowing for more efficient and effective operation of the system.

Process 1100 is shown to include receiving input data from one or more sensors associated with a flow control device (step 1102). The sensors can include a temperature sensor, a pressure sensor, a flow sensor, and/or any other types of sensors. A temperature sensor may be used to measure a temperature of fluid passing through the flow control device (e.g., devices 822, 824, 922, 924, 1022, 1024), for example. In some embodiments, a temperature sensor is embedded in the valve of the flow control device. A pressure sensor or a flow sensor may be used to calculate a flow rate of fluid through the flow control device. In some embodiments, one or more proximity sensors or other types of sensors can be used to determine the valve position of the flow control device. The fault detection and correction agent can use this input data to detect faults and initiate corrective actions.

Process 1100 is shown to include analyzing the input data according to a set of rules to determine if one or more faults have occurred (step 1104). The set of rules, for example, can include various threshold levels and relationships between different variables received in the input data. The fault detection and correction agent can be configured to dynamically adjust the rules used to detect faults based on training data and/or communication with other agents or devices. As an example, referring to system 900, FDC agent 952 can detect a fault if the fluid flowing through device 922 to heating coil 932 is not heated enough. In this case, heating coil 932 may not receive enough heated fluid and insufficient heating of a building space may be the result. As another example, referring to system 1000, FDC agent 1052 can detect that fluid flowing through device 1022 to cooling coil 1032 is within the correct temperature range but not enough fluid is flowing through the device. In this case, an insufficient amount of chilled fluid is provided to cooling coil 1032 and insufficient cooling of a building space may result.

Process 1100 is shown to include determining whether a fault can be corrected by opening or closing the valve of the flow control device (steps 1106 and 1108). For example, in the case where FDC agent 1052 detects insufficient flow of chilled fluid through device 1022, the insufficient flow may result from the valve of device 1022 being in a mostly closed position. In this case, FDC agent 1052 can determine the fault can be corrected by operating the actuator of device 1022 to move the valve to a more open position (step 1110). However, if the valve of device 1022 is already fully open, FDC agent 1052 can determine the fault cannot be fixed by opening or closing the valve.

Process 1100 is shown to include initiating a corrective action to be taken by another device in the HVAC system if the fault cannot be corrected by opening or closing the valve (step 1112). The FDC agent can communicate with a controller (e.g., controllers 840, 940, 1040), can communicate directly with the HVAC device, and/or can communicate with other agents to initiate the corrective action. For example, in the case where FDC agent 1052 detects insufficient flow of chilled fluid through device 1022 even though the valve is fully open, FDC agent 1052 can initiate the corrective action of instructing pump 1012 to increase pressure. FDC agent 1052 may communicate with an agent responsible for controlling pump 1012 and/or may communicate with controller 1040 to initiate this corrective action.

Figure 12:
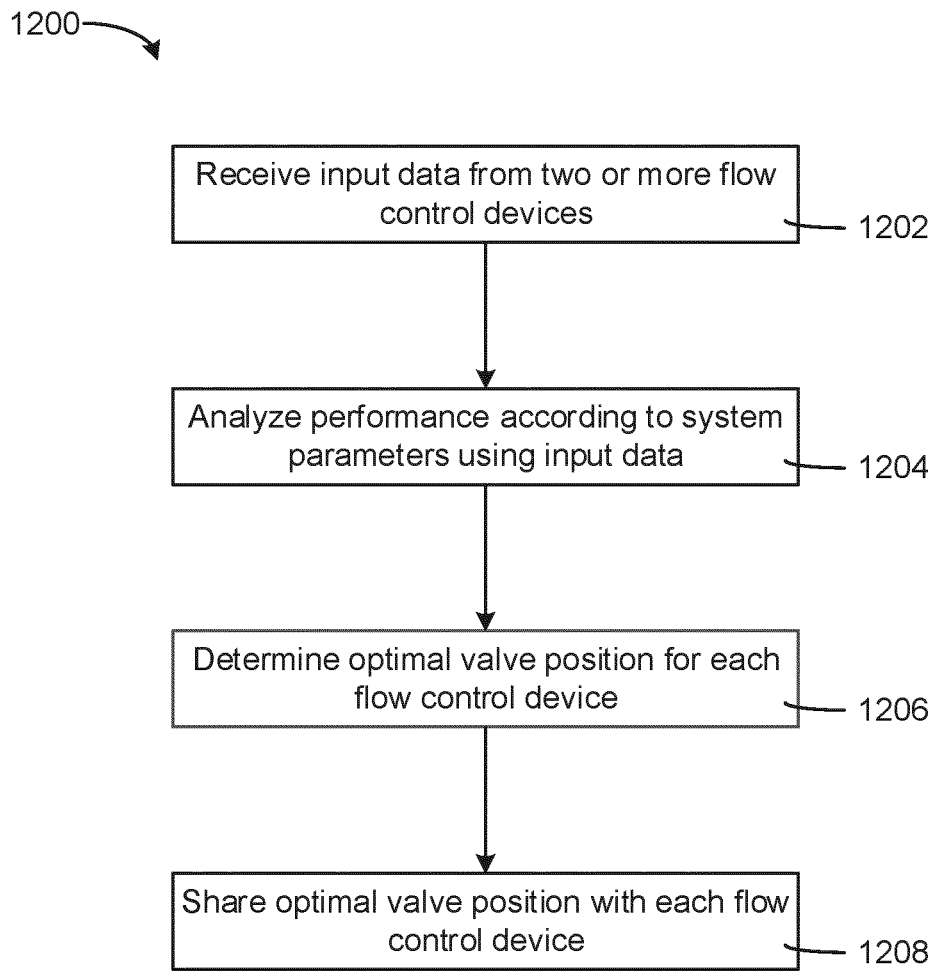
FIG. 12 is another flow diagram of an agent based flow control process, according to some embodiments.

Referring now to FIG. 12, a flow diagram of an agent based flow control process 1200 is shown, according to some embodiments. Process 1200 can be used in HVAC system 100 and can be performed by adaptive agent control system 500, for example. In some embodiments, process 1200 is performed by an optimization agent as described above (e.g., agents 872, 972, and 1072). Process 1200 can allow a flow control system to adaptively and dynamically adjust the valve position of various flow control devices in order to optimize performance of the system as a whole.

Process 1200 is shown to include receiving input data from two or more flow control devices (step 1202). Each of the flow control devices (e.g., devices 822, 824, 922, 924, 1022, 1024) can include a temperature sensor, a pressure sensor, a flow sensor, and/or any other types of sensors, as mentioned above. The input data can be used by the optimization agent to obtain a perception of the operating environment of each of the flow control devices. For example, the input data can provide the optimization agent with awareness of the flow of fluid through each device, the temperature of fluid flowing through each device, and the valve position of each device. The optimization agent may also receive input data directly and/or indirectly from all types of different building equipment (e.g., from chiller, pump, boiler, AHU, etc.).

Process 1200 is shown to include analyzing the performance of the flow control system according to a set of parameters (step 1204). For example, referring to system 1000, optimization agent 1072 may analyze the performance of the system according to input data received from flow control devices 1022 and 1024. In this case, optimization 1072 may analyze the input data in order to determine if cooling coil 1032 is receiving enough chilled fluid and if the chilled fluid is the correct temperature. Devices 1022 and 1024 are configured to operate in parallel with a common discharge, so the chilled fluid entering cooling coil 1032 is a sum of the chilled water being output from devices 1022 and 1024. One of the parameters used by optimization agent 1072 may be a supply air temperature setpoint measured by sensor 362 of airside system 300, for example. Depending on setpoint error, for example, optimization agent 1072 can be configured to open and/or close the valve of device 1022 and/or 1024 to optimize system performance.

Process 1200 is shown to include determining an optimal valve position for each flow control device (step 1206). The optimization agent can determine the optimal valve positions based on the analysis of the input data from the flow control devices. For example, referring to system 800, optimization agent 872 can determine that cooling coil 832 is not receiving enough chilled fluid. In response, optimization agent 872 can adjust the position of the valve of device 822 and/or device 824 to achieve the desired amount of flow to coil 832.

Process 1200 is shown to include sharing the optimal valve position with each flow control device in the system (step 1208). In some embodiments, the optimization agent shares the optimal valve position with the FDC agent of each device. In other embodiments, the optimization shares the optimal valve position with another agent local to the flow control devices. The optimization agent may also communicate a setpoint to the actuator of each flow control device. As an example, referring to system 900, if heating coil 932 is not receiving enough heated fluid and the valve of flow control device 922 is in a fully open position, optimization agent 972 can determine that the valve of device 924 can be moved to a more closed position in order to increase flow through device 922.

Figure 13:
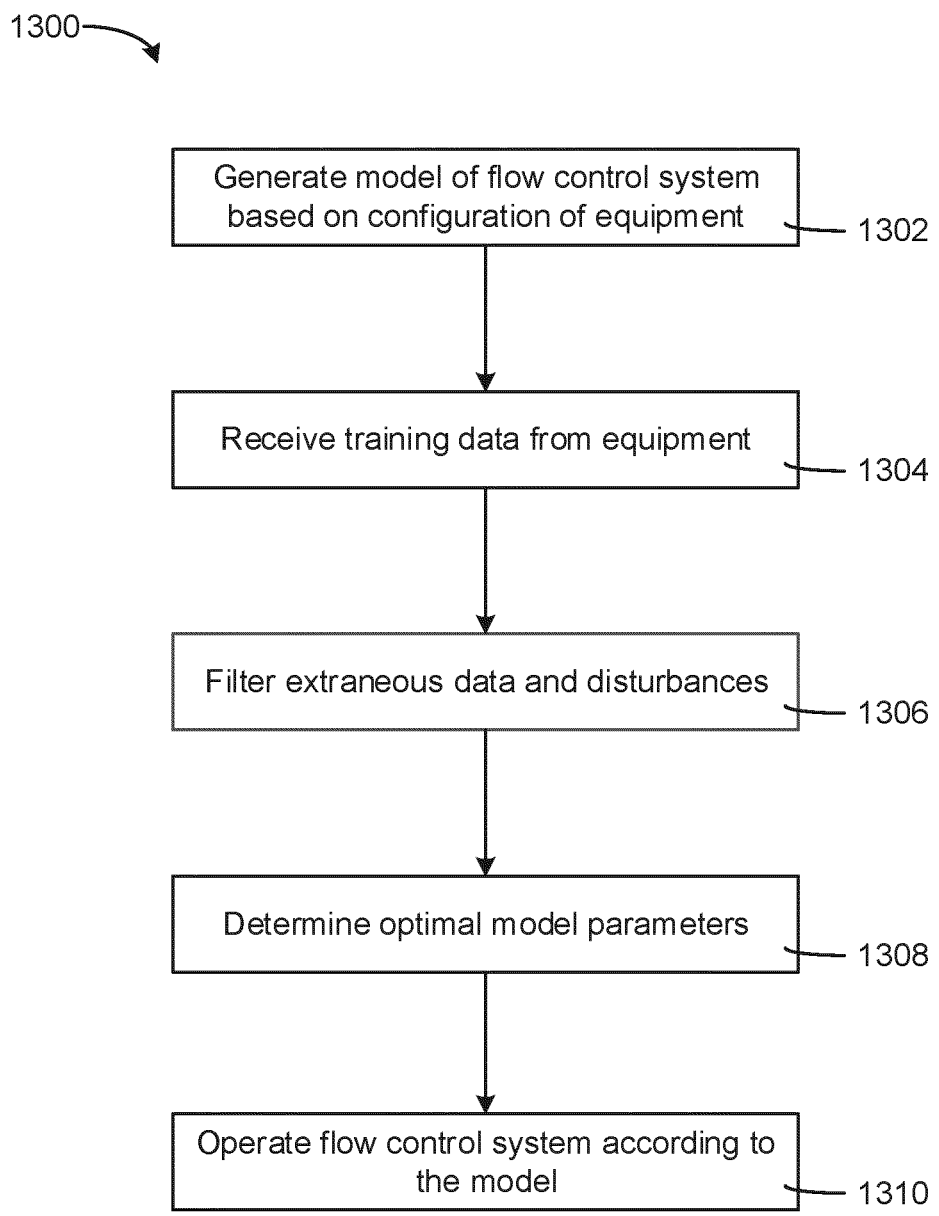
FIG. 13 is another flow diagram of an agent based flow control process, according to some embodiments.

Referring now to FIG. 13, a flow diagram of an agent based flow control process 1300 is shown, according to some embodiments. Process 1300 can be used in HVAC system 100 and can be performed by adaptive agent control system 500, for example. In some embodiments, process 1300 is performed by a learning agent as described above (e.g., agents 862, 962, and 1062). Process 1300 can allow a flow control system to adaptively and dynamically model components of the system (e.g., flow control device) in order to tune operating parameters.

Process 1300 is shown to include generating a model for the flow control system (step 1302). In some embodiments, the learning agent receives a framework model for the system. This framework model can be received from a variety of sources within adaptive agent control system 500 and may define relationships between the equipment included in the flow control system. For example, a model used to represent flow control system 800 can include mathematical relationships defining the series connection between flow control devices 822 and 824. In addition, the model may include variables related to inputs and outputs of chiller 802, pump 812, and cooling coil 832 in addition to variables related to flow control devices 822 and 824 (e.g., valve position, temperature readings, flow readings). All of these variables may be modeled as an equation or a system of equations, for example. Learning agent 862 can be configured to "fine tune" various parameters of this model. Learning agent 862 may additionally or alternatively use layout information from BAS attributes 622 to generate the model.

Process 1300 is shown to include receiving training data from one or more devices of the flow control system (step 1304). Training data can be received by varying inputs of the system in order to achieve a better understanding of how outputs of the system will react. For example, in system 900, learning agent 962 can adjust various control inputs to boiler 904 and pump 914 in order to learn and observe how the resulting flow of heated fluid reacts to these changes in input. In addition, learning agent 962 can gain a better understanding of how the flow of heated fluid through flow control device 922 changes if the valve position of device 924 is adjusted. The model of system 900 used by learning agent 962 becomes more accurate as more training data is received.

Process 1300 is shown to include filtering extraneous data and disturbances (step 1306). Step 1306 can be performed in order to allow the learning agent to distinguish between intended changes and changes caused by extraneous disturbances. For example, referring to system 1000, various measurements obtained from sensors associated with flow control device 1022 may be inaccurate due to sensor design challenges. Problems may arise due to communication issues or hardware issues, for example. Over time, learning agent 1062 can develop an ability to detect bad readings and filter such readings out of consideration. For example, if four consecutive samples of temperature readings from device 1022 are 22.1° F., 22.2° F., 31.4° F., and 22.1° F., learning agent 1062 can detect that 31.4° F. is an extraneous reading. Over time, learning agent 1062 can detect that a temperature change between successive samples should never be more than 2° F., for example. The ability to filter extraneous data and disturbances allows the learning agent to avoid reacting to false alarms.

Process 1300 is shown to include determining the optimal model parameters (step 1308). The learning agent can perform step 1308 at pre-defined time intervals (e.g., sampling period), for example. After training data is received and extraneous data is filtered, the learning agent can determine a set of optimal system parameters and use the optimal parameters to operate the flow control devices (step 1310).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A flow control device configured to control fluid flow in an HVAC system, the flow control device comprising:
   a valve, one or more sensors, and an actuator configured to open and close the valve; and
   one or more processors configured to:
      receive data from the one or more sensors;
      analyze the data from the one or more sensors according to a set of rules; and
      detect whether one or more faults have occurred;
      determine whether the fault can be corrected by opening or closing the valve;
      in response to determining the fault can be corrected by opening or closing the valve, correct the fault by operating the actuator to open or close the valve;
      in response to determining the fault cannot be corrected by opening or closing the valve, initiate a corrective action to be taken by another device in the HVAC system.

2. The flow control device of claim 1, wherein the fault is a low temperature fault.

3. The flow control device of claim 2, wherein the other device in the HVAC system is a boiler and the corrective action includes operating the boiler to produce heated fluid.

4. The flow control device of claim 1, wherein the fault is a high temperature fault.

5. The flow control device of claim 4, wherein the other device in the HVAC system is a chiller and the corrective action includes operating the chiller to produce chilled fluid.

6. The flow control device of claim 1, wherein the fault is either a high pressure fault or a low pressure fault.

7. The flow control device of claim 6, wherein the other device in the HVAC system is a pump and the one or more processors are further configured to operate the pump to either increase or decrease fluid pressure.

8. The flow control device of claim 1, wherein initiating the corrective action to be taken by another device in the HVAC system includes communication with one or more additional processors.

9. The flow control device of claim 1, wherein the one or more sensors include a thermistor embedded in the valve.

10. A flow control system configured to control fluid flow in an HVAC system, the flow control system comprising:
    a first flow control device comprising a first valve, one or more sensors, and a first actuator configured to open and close the first valve;
    a second flow control device comprising, a second valve, one or more sensors, and a second actuator configured to open and close the second valve;
    a controller comprising one or more processors configured to:
       receive data from the one or more sensors of the first flow control device and the second flow control device; and
       determine an optimal position of the first valve using the data from both the first flow control device and the second flow control device.

11. The flow control system of claim 10, wherein the first flow control device and the second flow control device operate in series to provide heated fluid to a heating coil or chilled fluid to a cooling coil.

12. The flow control system of claim 11, wherein the one or more processors are further configured to determine the optimal position of the first valve based on the optimal position of the second valve and a setpoint associated with the heating coil or the cooling coil.

13. The flow control system of claim 10, wherein the first flow control device and the second flow control device operate in parallel with a common discharge to provide heated fluid to a heating coil or chilled fluid to a cooling coil.

14. The flow control system of claim 13, wherein the one or more processors are further configured to determine the optimal position of the first valve based on the optimal position of the second valve and a setpoint associated with the heating coil or the cooling coil.

15. The flow control system of claim 10, wherein the first flow control device and the second flow control device operate in parallel with a common intake to provide heated fluid to two heating coils or chilled fluid to two cooling coils.

16. The flow control system of claim 15, wherein the one or more processors are further configured to determine the optimal position of the first valve based on the optimal position of the second valve and a setpoint associated with the two heating coils or the two cooling coils.

17. A flow control system configured to control fluid flow in an HVAC system, the flow control system comprising:

a plurality of flow control devices, each of the plurality of flow control devices comprising a valve, one or more sensors, and an actuator configured to open and close the valve; and one or more processors configured to:

receive and use data from the one or more sensors to generate a model for each flow control device using a system identification process, wherein the one or more processors operate the actuator of each flow control device according to the generated model.

18. The flow control system of claim 17, wherein the one or more processors are further configured to filter extraneous data and disturbances from the input data.

19. The flow control system of claim 17, wherein the one or more processors are further configured to update a set of model parameters using training data.

20. The flow control system of claim 19, wherein the one or more processors are further configured to update the model parameters at a predefined time interval.

* * * * *